United States Patent [19]
Date et al.

[11] Patent Number: 5,604,748
[45] Date of Patent: Feb. 18, 1997

[54] INFORMATION PROCESSING APPARATUS FOR TRANSMITTING INFORMATION AMONG A PLURALITY OF NODES AND ARBITRATION METHOD IN SUCH INFORMATION PROCESSING APPARATUS

[75] Inventors: Atsushi Date, Tokyo; Kazumasa Hamaguchi; Masato Kosugi, both of Yokohama; Toshiyuki Fukui, Kawasaki, all of Japan

[73] Assignee: Canon Kabushiki Kaisha, Tokyo, Japan

[21] Appl. No.: 383,184

[22] Filed: Feb. 3, 1995

[30]    Foreign Application Priority Data

Feb. 9, 1994  [JP]  Japan .................................. 6-015329

[51] Int. Cl.$^6$ .................................................. H04B 10/20
[52] U.S. Cl. ......................... 370/449; 359/120; 359/124; 370/462; 370/489
[58] Field of Search ....................................... 395/325, 725; 370/85.2, 85.3, 85.6, 94.3, 69, 124, 85.8; 340/825.51; 359/120, 121, 124

[56]                References Cited

U.S. PATENT DOCUMENTS

| | | | |
|---|---|---|---|
| 5,303,391 | 4/1994 | Simcoe et al. ........................... | 395/325 |
| 5,379,291 | 1/1995 | Herzberg et al. ....................... | 370/94.3 |
| 5,402,421 | 3/1995 | Hayasaka et al. ...................... | 370/85.2 |
| 5,420,985 | 5/1995 | Cantrell et al. ......................... | 370/85.2 |

FOREIGN PATENT DOCUMENTS 3733116   4/1988   Germany .

OTHER PUBLICATIONS

IBM Tech. Disc. Bull. , vol. 24, No. 10, Mar 1982, pp. 5188–5190, Blum, "Full Use Of Transfer Cycles In Computers".

*Primary Examiner*—Benedict V. Safourek
*Attorney, Agent, or Firm*—Fitzpatrick, Cella, Harper & Scinto

[57]               ABSTRACT

An information processing apparatus transmits data among a plurality of nodes connected to a common transmission line. An arbiter selectively gives use permission, to use the common transmission line for transmitting data, to one of the nodes that requests the use permission on the basis of at least a use request therefor. A data transmission state detector detects the data transmission state on the common transmission line by monitoring for a separate signal on the common transmission line, and notifies the detected state to the arbiter. The arbiter then can use the detected state to give use permission to a requesting node, for example when plural requests are overlappingly received. Advantageously, the separate signal is either an identifier which was added to data and indicates an end of that data, or an identifier that indicates that a current data transmission will be finished after the lapse of a predetermined time.

8 Claims, 11 Drawing Sheets

INFORMATION PROCESSING APPARATUS FOR TRANSMITTING INFORMATION AMONG A PLURALITY OF NODES AND ARBITRATION METHOD IN SUCH INFORMATION PROCESSING APPARATUS

BACKGROUND OF THE INVENTION

1. Field of the Invention

The present invention relates to an information processing apparatus for connecting a plurality of node apparatuses by a common transmission line and for transmitting information and, more particularly, to an information processing apparatus for executing parallel calculations and an arbitration method in such an information processing apparatus.

2. Related Background Art

Hitherto, as an arbitration method of using transmission lines in a parallel calculation system constructed by connecting a plurality of nodes, a method of detecting a collision in the transmission line, a method of additionally arranging an arbiter and giving a permission on the basis of a request order in accordance with use requests or fixed priorities, a method of allocating a use time of the transmission line to each node every predetermined time, and the like exist.

In the above conventional examples, according to the method of detecting a collision in the transmission line, there is a drawback such that processes and apparatuses such as monitoring means of use situations of the transmission lines by other nodes, interval management until a request is again made after a collision was detected, and the like are complicated.

According to the method of additionally arranging an arbiter and giving a permission on the basis of the request order in accordance with the use requests or the fixed priorities, in the case where after the arbiter received a notification indicative of the end of a data transfer that is at present being executed, a long time is needed to transmit a use permission for a node to which the use of the transmission line is subsequently permitted, there is a problem such that a period of time during which the data transfer is not executed after completion of the present data transfer exists, so that a use efficiency of the transmission line is deteriorated. According to the method of allocating a right to use the transmission line to each node every predetermined time, when data of a variable length is transferred, it is necessary to divide long data and transmit the divided data.

SUMMARY OF THE INVENTION

The present invention is made in consideration of the above problems. According to the invention, by constructing an information processing apparatus as follows or by performing an arbitration, in the case where requests to use a common transmission line are overlappingly generated, a data transmission state on the common transmission line is detected before a notification of the end of the use of the common transmission line from a node to which a use permission of the common transmission line was previously given comes, thereby judging that the use of the common transmission line was finished or is finished after the elapse of a predetermined time and enabling the next use permission to be generated. Therefore, there is no need to specify the time that is required for data transmission in the common transmission line and a time at which an end notification of the use of the common transmission line which was previously permitted is transmitted and a time for generating the next permission of the use of the common transmission line can be overlapped. The apparatus can also cope with the data transmission of a variable length.

In one aspect of the present invention, an information processing apparatus for transmitting information among a plurality of nodes, includes:

a plurality of nodes which are connected by a common transmission line;

an arbiter which gives a use permission of said common transmission line on the basis of a use request of said common transmission line from said node;

information transmitting means which couples said arbiter and each of said nodes and is used to transmit said use request; and data transmission state detecting means for detecting a data transmission state of data that is transmitted on said common transmission line and for notifying the detected data transmission state to said arbiter.

In one aspect of the present invention, an arbitration method in an information processing apparatus comprising a plurality of nodes connected by a common transmission line, an arbiter to give a use permission of said common transmission line on the basis of a use request of said common transmission line from said node, information transmitting means which connects said arbiter and each of said nodes and is used to transmit said use request, and data transmission state detecting means for detecting a data transmission state of data that is transmitted on said common transmission line and for notifying the detected data transmission state to said arbiter, includes the steps of:

giving a common transmission line use permission for the first use request received earlier among said common transmission line use requests overlappingly generated by said arbiter;

detecting by said data transmission state detecting means the use state of said common transmission line based on that said first use request was permitted; and giving the common transmission line use permission for the second use request received after said first use request after it was detected that the use of the common transmission line based on the permission of said first use request was finished or is finished after the elapse of a predetermined time.

DETAILED DESCRIPTION OF THE PREFERRED EMBODIMENTS

[First embodiment]

According to the first embodiment, the apparatus is constructed such that a plurality of nodes and a concentrator comprising an arbiter and a star coupler are connected by an optical fiber. A plurality of transmission lines are multiplexed on the optical fiber by a wavelength multiplexing. According to the embodiment, two wavelengths are multiplexed, a wavelength $\lambda 1$ used for arbitration by an information transmitting means for arbitration and a wavelength $\lambda 2$ for data transfer in a common transmission line.

Figure 1:
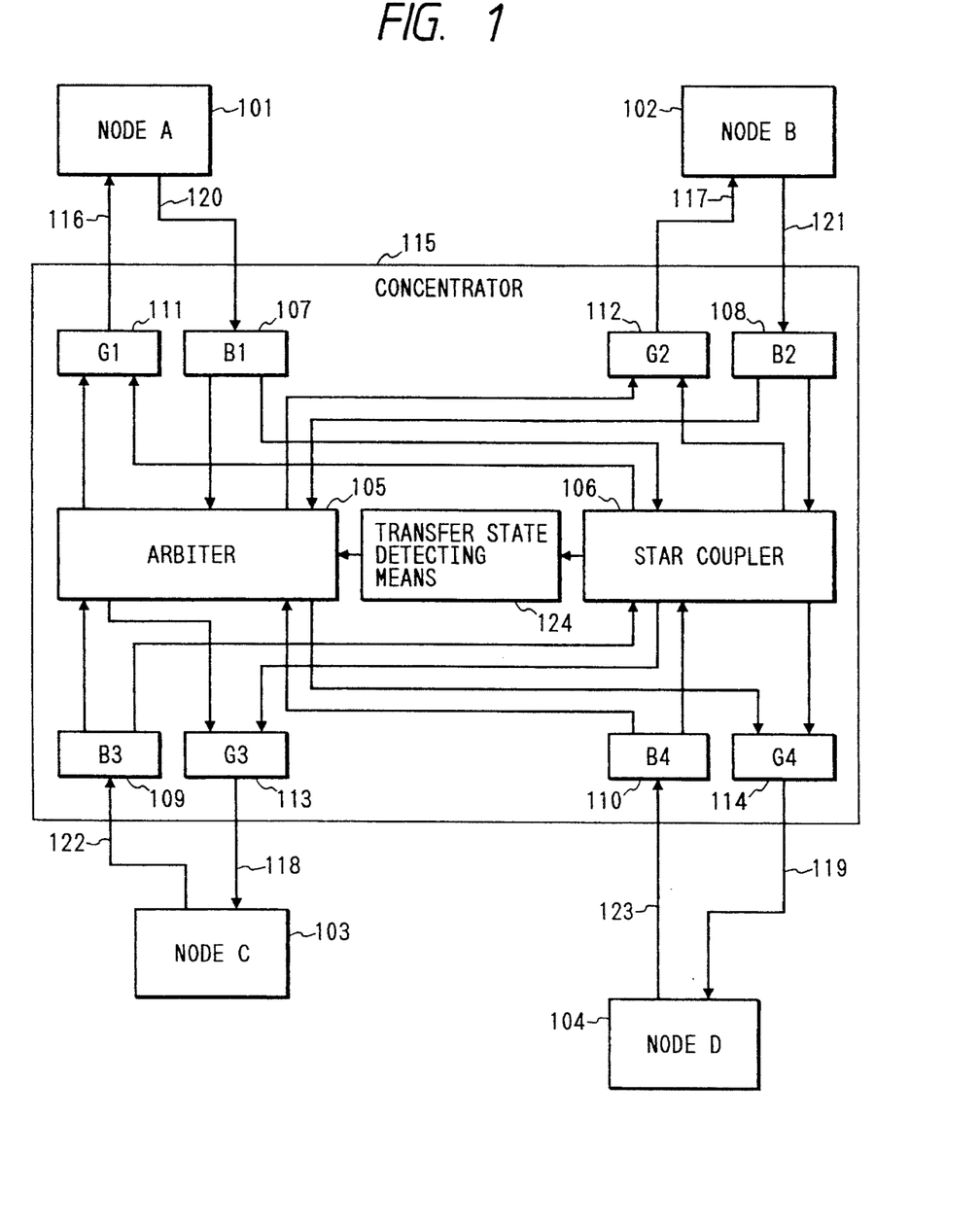
FIG. 1 is a block diagram of a system according to the invention.

FIG. 1 is a diagram showing the construction of an information-processing apparatus according to the invention.

Reference numerals 101, 102, 103, and 104 denote calculating nodes; 115 a concentrator for connecting the nodes; 116, 117, 118, 119, 120, 121, 122, and 123 optical fibers for connecting the nodes and the concentrator; 107, 108, 109, and 110 wavelength demultiplexers each for wavelength-demultiplexing optical signals, whose wavelengths were multiplexed and inputted from the nodes, into a wavelength for arbitration and a wavelength for data transfer; 111, 112, 113, and 114 wavelength multiplexers each for wavelength-multiplexing the wavelength for arbitration and the wavelength for data transfer; 105 an arbiter; 106 an optical star coupler; and 124 a circuit for detecting a data transfer state by an optical signal which is generated from a star coupler section.

Figure 2:
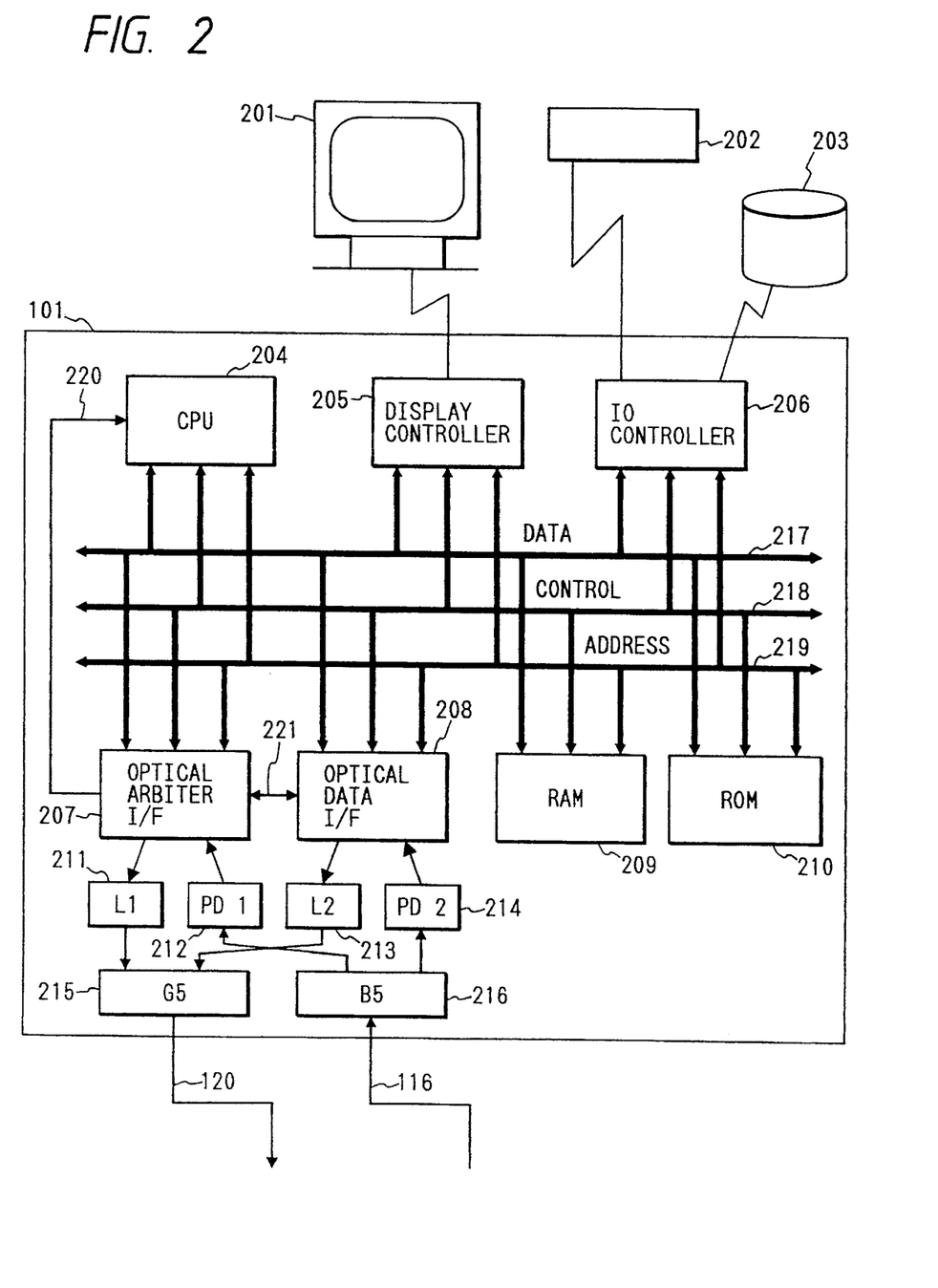
FIG. 2 is a block diagram of a node.

FIG. 2 is a diagram showing a calculating node.

Reference numeral 101 denotes the node (A) in FIG. 1. Each of the nodes (B), (C), and (D) also has the same construction as that of the node (A). Reference numeral 201 denotes a display apparatus; 202 a keyboard; and 203 a disk apparatus. Those apparatuses are the general apparatuses which are used in an ordinary personal computer, workstation, or the like. Reference numeral 204 denotes a processor in the calculating node. The processor 204 executes various information processes by using a display controller 205 and an IO controller 206 on the basis of programs and data stored in a RAM 209 and a ROM 210. Those constructions are conventional in a general computer and are not limited by the invention. Reference numeral 217 denotes a data bus in the calculating node; 218 a control bus in the same calculating node; and 219 an address bus. Those buses are arbitrated by a bus arbiter in the processor 204 and are used for the data transfer which is executed by the processor 204 and an optical data interface 208 (hereinbelow, the interface is referred to as an I/F). Reference numeral 207 denotes an optical arbiter interface; 208 the optical data interface; 211 and 213 laser light emitting devices; 212 and 214 photodiodes; 215 a wavelength multiplexer for wavelength-multiplexing laser signals having different wavelengths which are emitted from the laser light emitting devices 211 and 213, respectively; 120 the optical fiber connected to the concentrator; 216 a wavelength demultiplexer for wavelength-demultiplexing the optical signal supplied from the concentrator; 220 bus use request signals for the processor 204; and 221 information transmission signals between the optical arbiter I/F and the optical data I/F.

Figure 3:
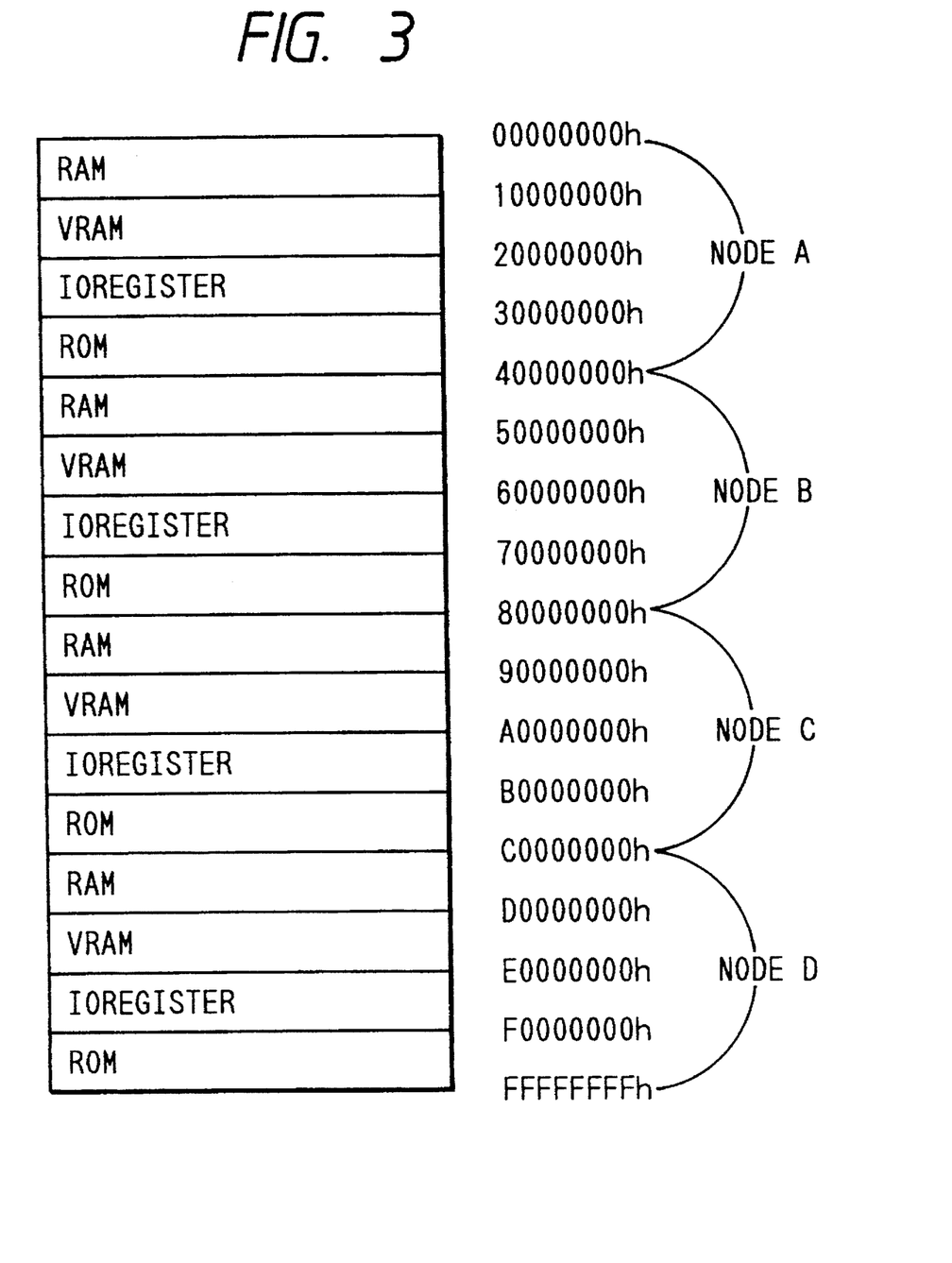
FIG. 3 is a diagram showing a system address map.

FIG. 3 is an address map of the whole system. According to the embodiment, four giga bytes of the address space of the whole system are distributed to four nodes and are used.

A transmitting procedure of information between the nodes will be first described.

An explanation will now be given as an example with respect to the case where the node (A) reads out data from a specific address in the RAM in the node (B).

The processor 204 in the node (A) first obtains the right to use the bus in a manner similar to the normal reading operation from the RAM (such a process is arbitrated by the bus arbiter of the processor). When the use right is given, the RAM address 40000000h as a read address of the node (B) is supplied to the address bus and the other addition information is supplied to the control bus, thereby executing a read request. There is no device in the node (A) which responds to this address.

Figure 4:
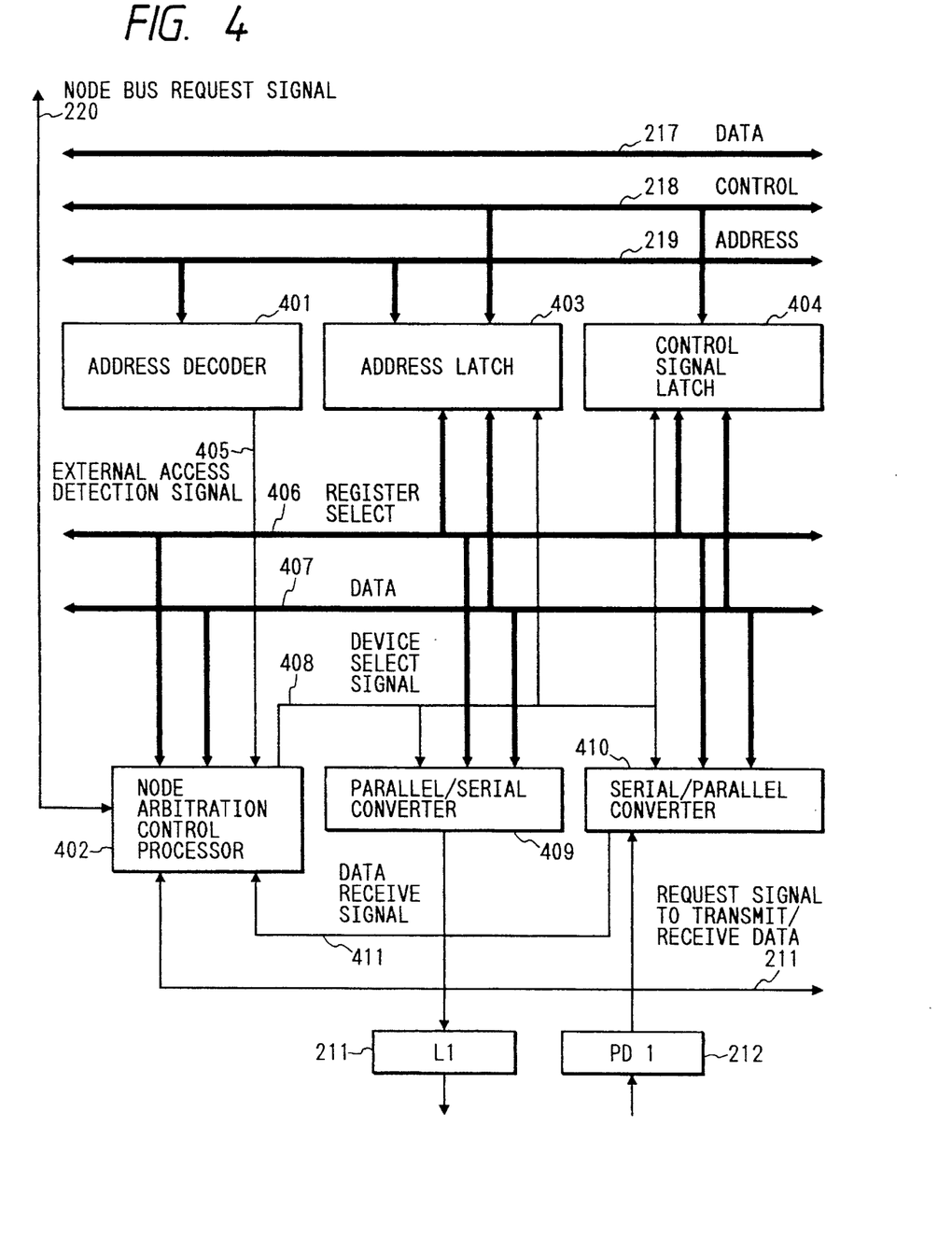
FIG. 4 is a block diagram of an optical arbiter interface.
Figure 5:
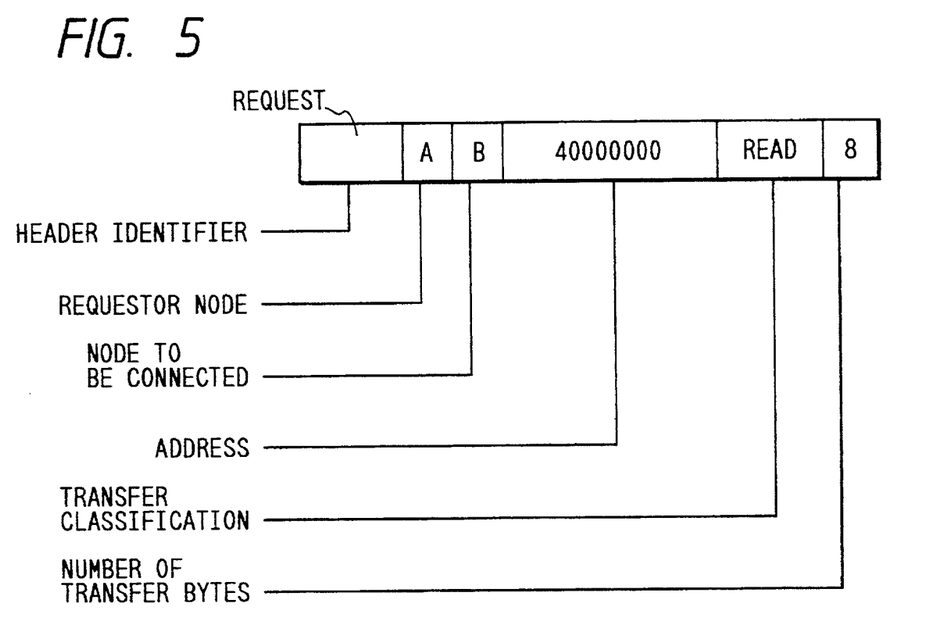
FIG. 5 is a diagram showing a construction of a request packet.

FIG. 4 is a block diagram of the optical arbiter interface 207. In the optical arbiter I/F, in a manner similar to the ordinary memory controller, an address decoder 401 which always monitors the information that is transferred to the bus detects that the address generated by the processor is the address of a node other than its own node. Such a fact is notified to the program which operates on a node arbitration control processor 402 by an external access detection signal 405. The address 40000000h is also latched into an address latch register 403 and control information such as number of transfer bytes for each reading/writing request classification and the like is latched into a control signal latch 404. In the embodiment, a one-chip micro controller is used as a node arbitration processor 402. However, such a construction is not limited by the invention and the apparatus can be also constructed by a hardware logic or the like. The node arbitration processor 402 reads out the information latched in the address latch 403 and control signal latch 404 by the ordinary reading operation by using a device select signal 408 and a register select signal 406 and compares it with the address map of FIG. 3, thereby judging which node is to be connected. The processor 402 forms an arbitration request packet shown in FIG. 5 for requesting connection to the node (B) and writes the packet into a parallel/serial converter 409. The parallel/serial converter 409 converts the written information into serial data and supplies it to the laser diode 211. The laser diode 211 photoelectrically converts the input signal to an optical singal of the wavelength $\lambda 1$ as a wavelength for arbitration. The optical signal passes through the wavelength multiplexer 215 and is supplied to the arbiter 105 through the fiber 120. The above construction is common to all of the nodes.

Figure 6:
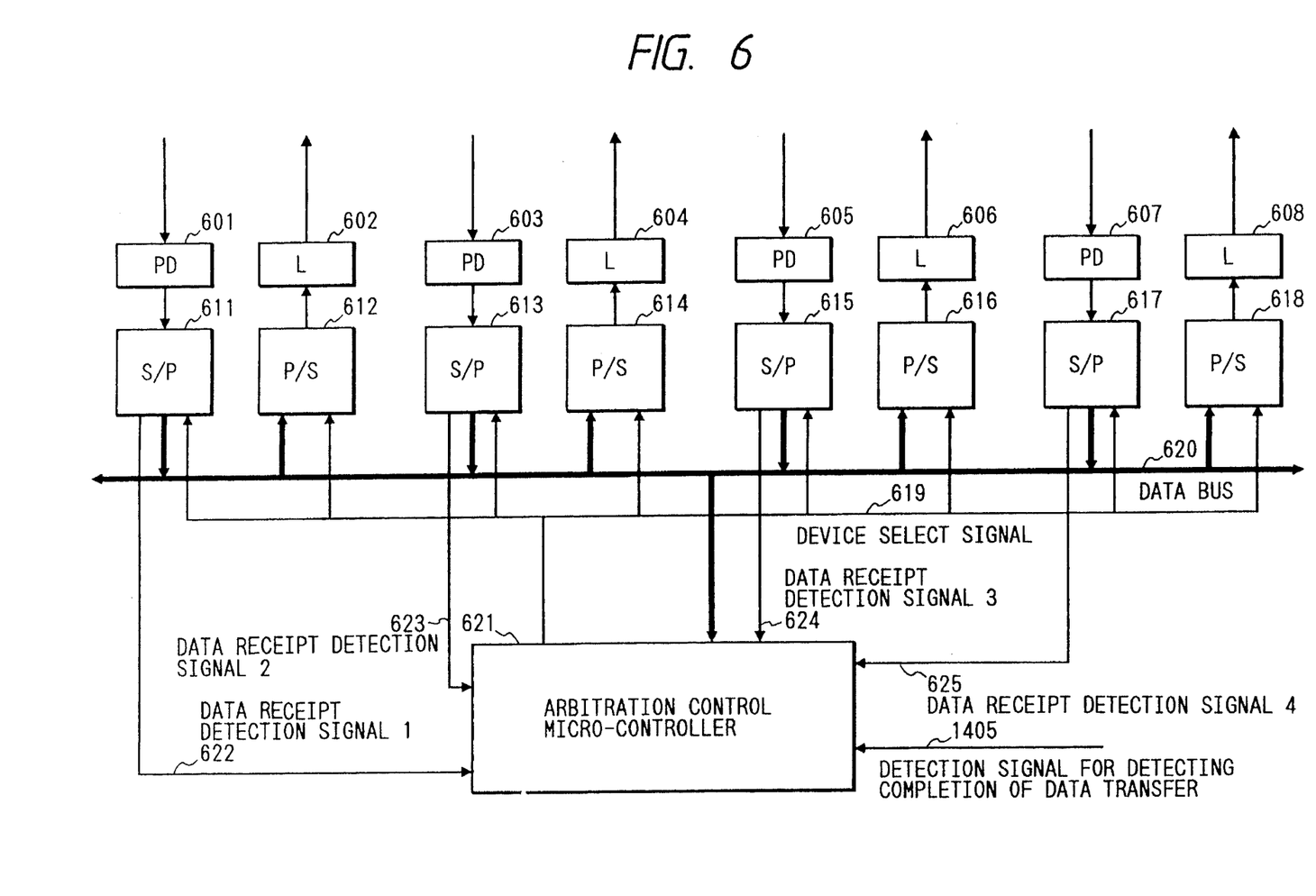
FIG. 6 is a block diagram of an arbiter section.

FIG. 6 shows a block diagram of the arbiter section 105. Reference numerals 601, 603, 605, and 607 denote photodiodes for receiving the optical signals of the wavelength $\lambda 1$ demultiplexed by the wavelength demultiplexer 107, 108, 109, and 110 in the concentrator 115, namely, the arbitration request signals and converting them into the electric signals, respectively. The request signal now reaches from the node (A) and is supplied to a serial/parallel converter 611. The serial/parallel converter 611 converts the input serial electric signal to the parallel signal and also notifies to an arbitration control microcontroller (ACMC) 621 by a data receipt detection signal 622. In the embodiment, the ACMC 621 is constructed by a micro-controller having therein a ROM in which the programs have been stored and an RAM that is used for processes. The construction, however, is not limited by the invention.

Figure 7:
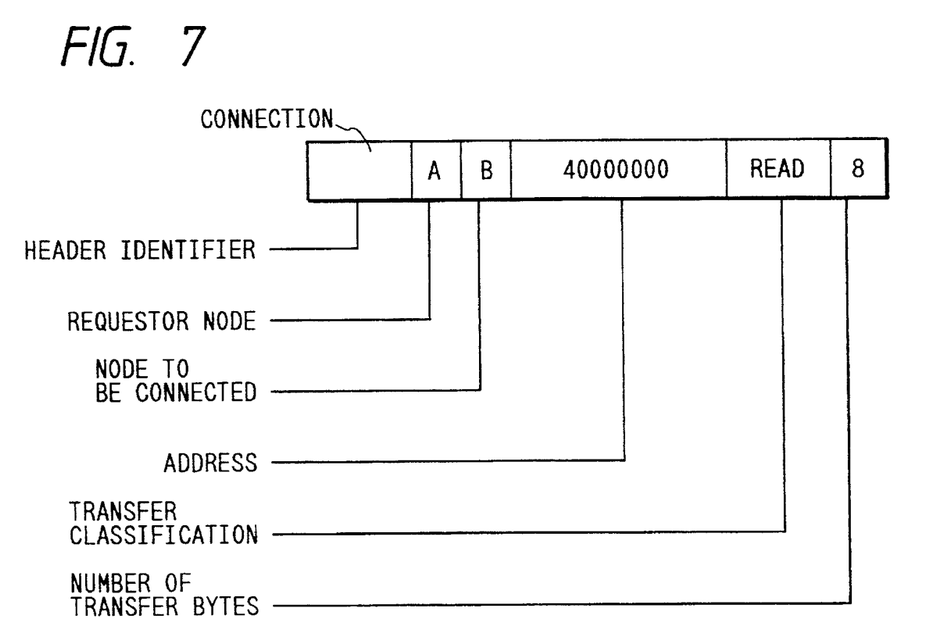
FIG. 7 is a diagram showing a construction of a connection preparation request packet.

When the data receipt detection signal 1 (622) is received, the ACMC 621 selects the serial/parallel converter 611 by a device select signal 619 and reads out the request packet sent from the node (A) from an internal register through a data bus 620. After that, the packet is analyzed and a comparison with the address map in FIG. 3 or the like is executed, thereby detecting that the use request of the transmission line is the connection request from the node (A) to the node (B). After that, a transmission line use state flag provided in the ACMC in a software manner is checked. In case of a usable state, the flag is set into an in-use state. A connection preparation request packet shown in FIG. 7 is formed and written into parallel/serial converters 612 and 614, respectively.

The two connection preparation request packets which were formed and written by either one of the above methods are outputted to the nodes (A and B) via the wavelength multiplexers 111 and 112 by using the optical signal of $\lambda 1$.

At the node (A) again, as for the optical signal inputted by the fiber 116, the signal of the wavelength $\lambda 1$ is demultiplexed by wavelength demultiplexer 216 and is converted to the electric signal by the photodiode 212 and is inputted to the optical arbiter interface 207. In the optical arbiter I/F 207, the input signal is converted to a parallel signal by a serial/parallel converter 410 and the arrival of the packet is notified to the node arbitration control processor 402 by a data receive signal 411. The node arbitration processor of the node (A) reads out the connection preparation request packet from the serial/parallel converter 410 by using the device select signal 408 and a data bus 407 and detects that the connection was permitted. The processor subsequently instructs the optical data interface 208 to wait for data reception by using a data transmission/reception request signal 211.

Thus, the node (A) is set into a state in which the data can be received.

At the node (B), on the other hand, as for the optical signal inputted by the fiber 117 (116 in FIG. 2), the signal of the wavelength $\lambda 1$ is wavelength-demultiplexed by the wavelength demultiplexer 216 [since the construction of each node is substantially identical, the operations of the node (B) will now be explained with reference to FIGS. 2 and 4]. The demultiplexed signal is converted to an electric signal by the photodiode 212 and is inputted to the optical arbiter I/F 207. The input signal is converted to parallel signals by the serial/parallel converter 410 and is also notified to the node arbitration control processor 402 by the data receive signal 411. When such a notification is detected, the node arbitration processor of the node (B) reads out the connection preparation request packet from the serial/parallel converter 410 by using the device select signal 408 and data bus 407 and requests the bus use permission in the node to the arbiter in the processor 204 by using the node bus request signals 220. The processor 204 immediately stops the use of the buses 217, 218, and 219 and notifies the use permission of the buses to the node arbitration control processor by using the node bus request signals 220. When the use permission of the buses is given, the node arbitration control processor instructs so as to read out eight bytes from the address 40000000h on the basis of the contents of the packet in FIG. 7 for the optical data interface 208 by using the data transmission/reception request signals 211 and to output to the laser diode 213.

Figure 8:
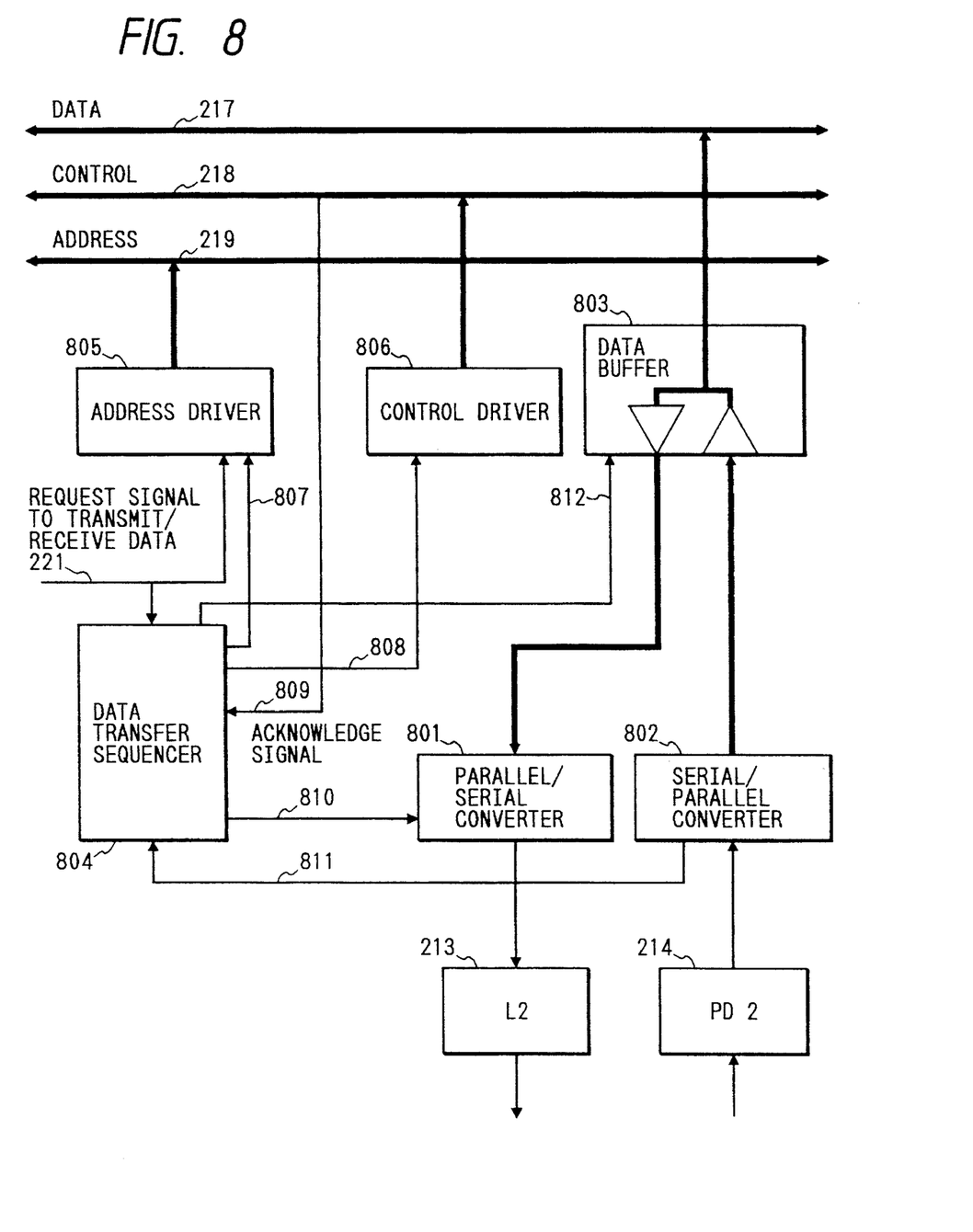
FIG. 8 is a block diagram showing an optical data interface section.

FIG. 8 shows the optical data interface section. The address 40000000h is instructed to an address driver 805 and a request to read eight bytes is instructed to a data transfer sequencer 804 by the data transmission/reception request signals.

Figure 12:
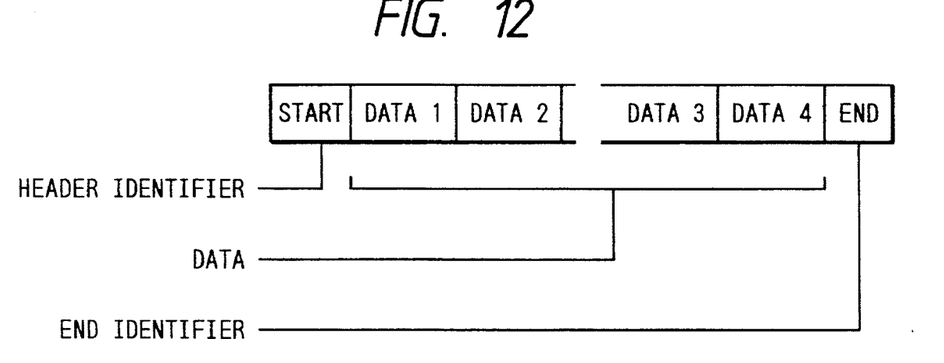
FIG. 12 is a diagram showing a construction of a transfer data packet.

The sequencer 804 instructs the driving of the address to the address driver by a signal 807 and subsequently instructs the driving to the buses of control signals such as transfer size, read/write signal, and the like to a control driver 806. Thus, a transaction of the ordinary memory reading operation occurs to the buses in the node. A memory controller (not shown) drives the data in response to such a request and drives the acknowledge signal after that. When the acknowledge signal is detected, the data transfer sequencer first instructs by using a signal 810 to a parallel/serial converter 801 so as to send "start" as a header identifier of the transfer data packet in FIG. 12. After that, the data read by the data bus is subsequently sequentially converted into the serial signal by the parallel/serial converter 801 and is outputted. The above operations are repeated until the number of transfer bytes reaches the number of bytes which has previously been requested by the data transmission/reception request signal 221. After a predetermined number of data were transmitted, an end identifier in FIG. 12 is sent and the apparatus is returned to an idle state.

As such identifiers by the packet, patterns of bits which cannot occur in the ordinary data transfer by the 4B/5B conversion at the time of the parallel/serial conversion are selected. Such a method is general as a data forming method in the serial transmission.

The serial converted signal is converted into an optical signal having a wavelength of $\lambda 2$ as a wavelength for data transfer by the laser diode L2 (213) and is outputted to the concentrator 115 via the wavelength multiplexer 215.

In the concentrator 115, the wavelength of $\lambda 2$ is demultiplexed by the wavelength demultiplexer 108 from the inputted optical signal and is outputted to the star coupler 106. The star coupler 106 distributes the optical signal and outputs to the nodes (A to D).

The optical signal of $\lambda 2$ is distributed to the node (A) 101 by the optical fiber 116 via the wavelength multiplexer 111.

At the node (A) 101, the optical signal of $\lambda 2$ is demultiplexed by the wavelength demultiplexer 216 in FIG. 2 and is converted to the electric signal by the photodiode 214 and is inputted to the optical data interface 208. The processes at the node (A) will be further described hereinbelow with reference to FIGS. 8 and 4. At the node (A), it is instructed by the node arbitration control processor 402 as mentioned above so as to supply the data in response to a read request from the processor. Namely, the data transfer sequencer 804 is set so as to drive the data bus for a data buffer 803. A serial/parallel converter 802 converts the serial data to the parallel data and outputs to the data buffer 803 and also outputs a data receipt detection signal 811 to the data transfer sequencer 804.

The data transfer sequencer instructs a control driver 806 after completion of a predetermined delay to drive an acknowledge signal in order to assure a time during which the data bus 217 is driven. The data transfer sequencer also notifies the preparation and transmission of an end packet to the node arbitration processor by using a part of the signal 221 to request the transmission/reception of the data.

In the node arbitration processor, the header section makes a transfer end packet indicative of the end of transfer in a manner similar to the foregoing transmission of the connection request packet and sends to the arbiter.

The arbiter 105 receives and interprets the transfer end packet in a manner similar to the case of the foregoing connection request packet and sets the flag indicative of the use state of the transmission line into the usable state to be rendered to an idle state so as to receive the next connection request.

Thus, the data in an address 40000000h at the requestor node (B) is supplied to the processor 204 at the node (A).

As for the writing operation, processes are executed by almost similar operations except that only the data transfer direction or the like is reversed.

The processes are also similarly executed with respect to the transfer between the other nodes.

The above explanation has been made on the assumption that the use request of the common transmission line is not overlappingly generated in the information processing apparatus of the invention.

Figure 9:
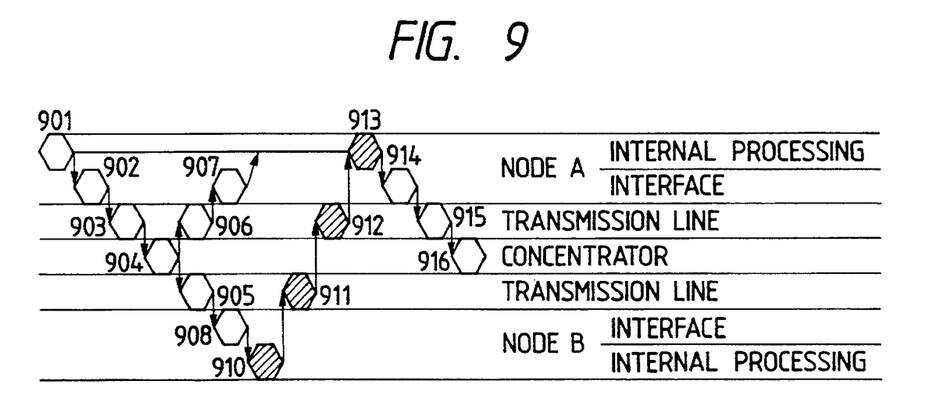
FIG. 9 is a timing chart for a reading process.

The above operations are shown in a timing chart of FIG. 9. The axis or abscissa denotes time. A length in the direction of the abscissa of a hexagon in the diagram indicates a time which is required for the processes. An arrow shows a flow of processes. A hexagon of a blank portion shows arbitration information. A hatched hexagon shows data information to be transferred. The upper stage of the column of the node (A) and the lower stage of the column of the node (B) show internal processes in the nodes. The lower stage of the column of the node (A) and the upper stage of the column of the node (B) denote processes in the interface sections of the nodes.

The above description and FIG. 9 correspond as follows. First, a processor reading request 901 generated at the node (A) is sent from the interface section (902) and is transferred on the transmission line with a predetermined time period (903) and reaches the concentrator. The arbiter in the concentrator notifies that the connection request is admitted. The arbiter subsequently forms a packet to instruct the reception of the data and a packet to instruct the transmission of the data and supplies those packets to the nodes (A) and (B), respectively (904). Each packet is transferred on the transmission line for a predetermined time (905, 906). At the node (A), the transmitted packet is received (907) and the apparatus waits for the transmission of the data. At the node (B), the transmitted packet is received (908) and the data in the node (B) is read and transmitted (910). The data is transmitted on the transmission line (911, 912) and reaches the node (A) and is processed therein (913). After that, a packet to notify the end of the series of data transfer is sent from the node (A) (914) and is transmitted with a predetermined time period (915). An end process is executed in the arbiter (916).

The reference numerals in the diagram which were used in the transmission between the nodes (A and B) are also commonly used in the following description and drawings.

The case where the use requests are overlapped on the common transmission line will now be described. For explanation of comparison, the case of applying the conventional arbitration method to the information processing apparatus of the present invention, namely, the case where the end of the data transfer mentioned above is confirmed by receiving the packet indicative of the end of data transfer, which is sent to the arbiter from the node which received the data, and the next permission of the use of the common transmission line is issued will be first described with reference to FIG. 10. The hexagon of a blank portion indicates arbitration information which earlier reaches the arbiter. The black hexagon shows arbitration information to be processed after that. Each of the upper stage of the column of the transmission line that is located above the column of the concentrator and the lower stage of the column of the transmission line that is located below the column of the concentrator indicates a channel of $\lambda 2$ as a common transmission line. Each of the lower stage of the column of the transmission line that is located above the column of the concentrator and the upper stage of the column of the transmission line that is located below the column of the concentrator indicates the channel of $\lambda 1$ as an arbitration transmission line.

Figure 10:
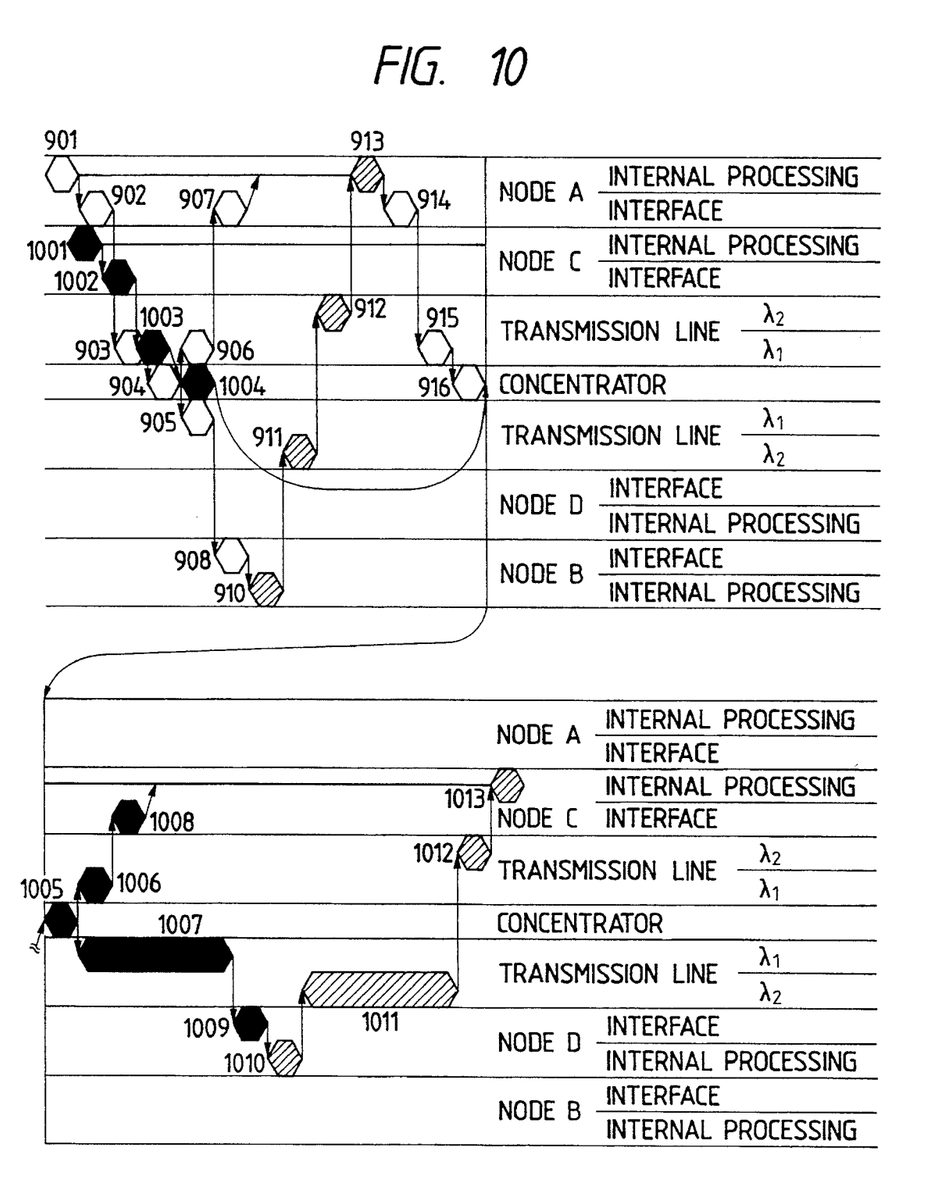
FIG. 10 is a processing timing chart when requests are overlapped in the case where a conventional arbitration method is used in an information processing apparatus of the present invention.

Such a case is considered that the node (A) processor reading request 901 and a node (C) processor reading request 1001 are almost simultaneously generated.

Since a request packet 1002 from the node (C) is transmitted with a slight delay from a request packet 902 from the node (A), a request arrival 904 from the node (A) occurs so as precede to an arrival 1004 from the node (C) in the concentrator. Since both of the packets 902 and 1002 have the wavelength $\lambda 1$ on the transmission line, the optical signals are overlapped and they are seen as if an interference occurred (903, 1003). In the embodiment, however, since the transmission line for arbitration connects the arbiter and the node in a one-to-one corresponding manner, no interference occurs.

At the time point 904, the common transmission line is in a usable state. In the arbiter, the above use state flag is set into an in-use state and the execution of the transfer is instructed to the nodes (A and B). The data transfer between the nodes (A and B) is executed hereinbelow in a manner similar to the case of FIG. 9. Although the request from the node (C) reaches from the node (A) at the time point 1004, since the use state flag is in the in-use state, such a request is held until a time point 916 at which the end packet reaches from the node (A). After that, the use of the transmission line is permitted to the nodes (C and D) and the transferring process is restarted. (Making and transmission 1005 of a connection preparation request packet, transmission 1006 and 1007 of the packets, reception 1008 and 1009 of the packets, reading and transmission 1010 of data, data transmission 1011 and 1012, data reception 1013.) After that, the end packet indicative of the end of the series of data transfer is sent to the concentrator (not shown).

In this case, after the transmission by the wavelength $\lambda 2$ is finished at a time point 912, a blank period during which the transmission line is not used until it is again used at 1011 exists.

The case of the information processing apparatus according to the invention will now be described with reference to FIG. 13.

Figure 11:
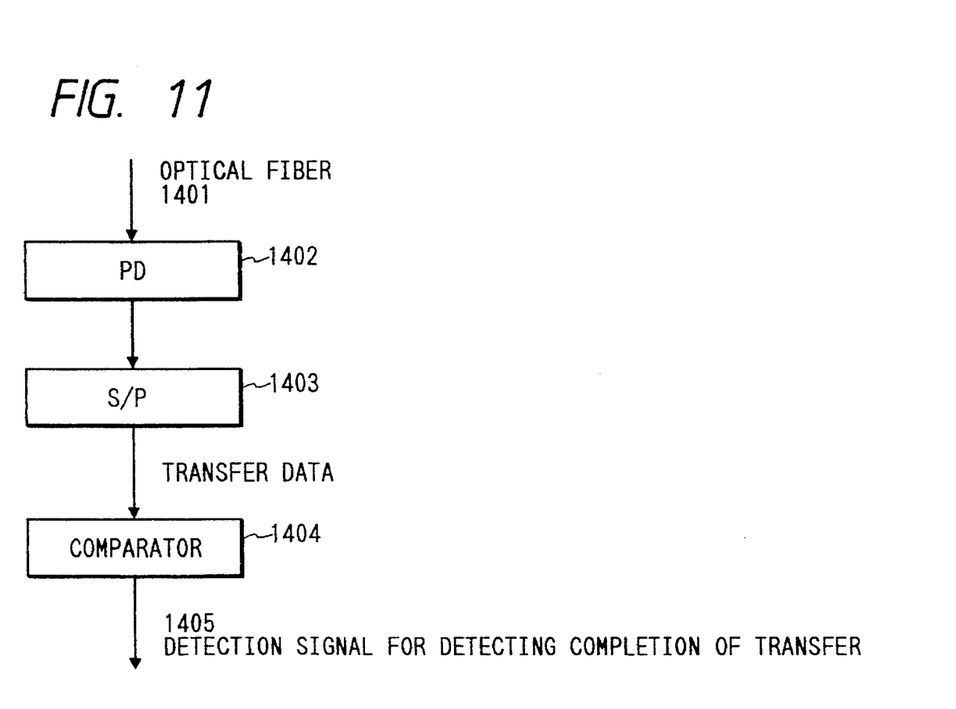
FIG. 11 is a diagram showing a construction of data transfer state detecting means.
Figure 13:
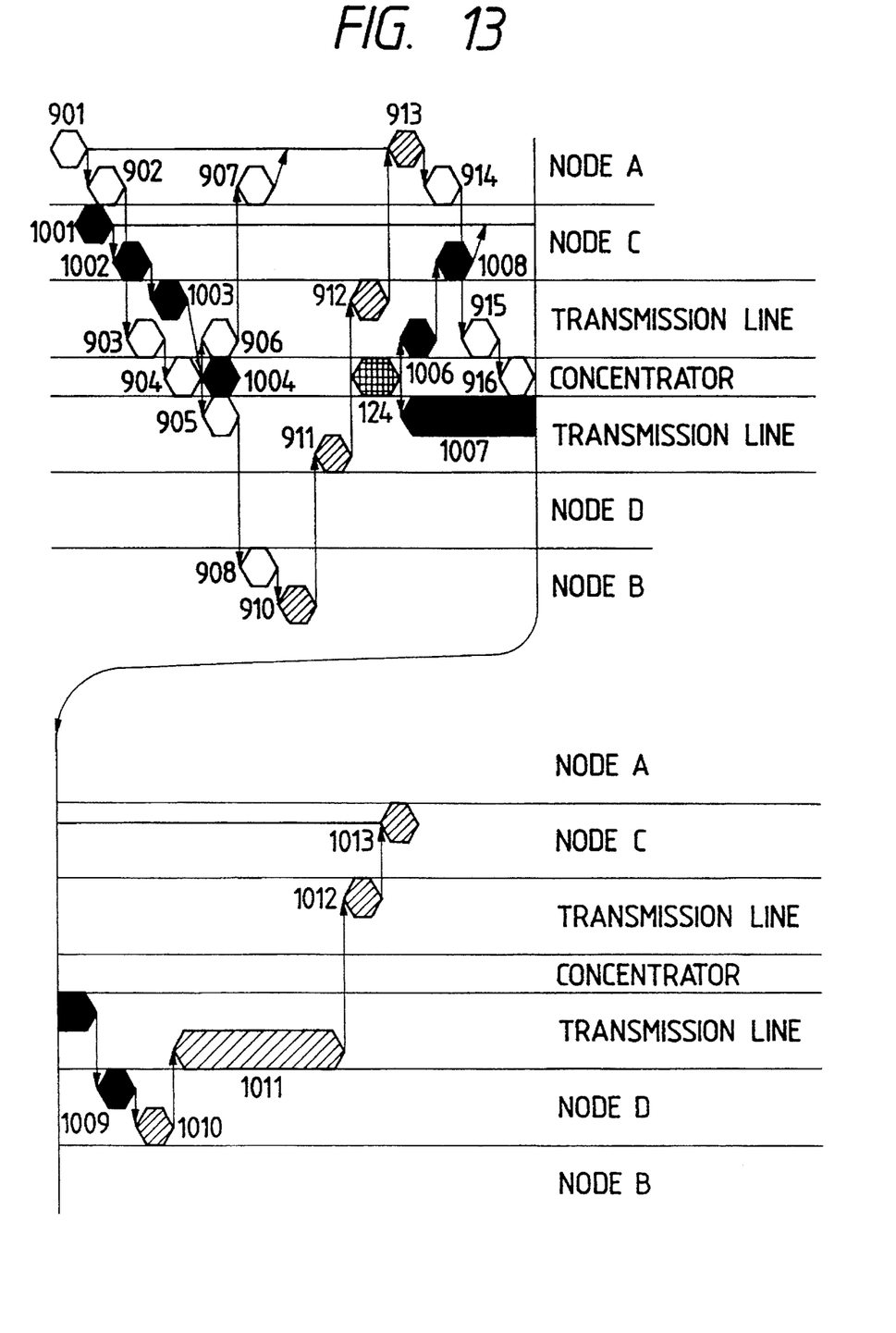
FIG. 13 is a processing timing chart when requests are overlapped according to the first embodiment.

In FIG. 13, the processes which are executed until the requests to use the data transmission line are overlapped to reach the arbiter section are the same as those in the conventional apparatus in FIG. 10. After the arbitration was executed, the arbiter section issues the permission to use the common transmission line to the nodes (A and B), thereby starting the data transmission. After that, the existence of the request to use the common transmission line from the node (C) is stored. The ACMC monitors a transfer end detection signal which is inputted from the data transfer state detecting means 124. After that, the transfer of the data packet is started from the node (B) to which the use permission of the transmission line is given. The data packet sent from the node (B) with the wavelength $\lambda 2$ passes through the star coupler section in the portion of the data movement from 911 to 912 in FIG. 13. A construction of the data transfer state detecting means is shown in FIG. 11. As shown in the diagram, the data packet in FIG. 12 which had been outputted from the star coupler and inputted to the data transfer state detecting means 124 and was transmitted from the node (B) via an optical fiber 1401 is inputted to a photodiode 1402. The data transfer packet which was photoelectrically converted by the photodiode 1402 is sequentially converted to the parallel signals by a serial/parallel converter 1403 and inputted to a comparator 1404. The comparator 1404 always monitors those transfer data and compares them with a data pattern which has previously been stored in the comparator, thereby detecting "start" data and "end" data in FIG. 12.

The comparator 1404 asserts a transfer end detection signal 1405 when the end data is detected, thereby notifying that all of the data packets passed through the star coupler section to the ACMC.

When the transfer end detection signal is inputted, the ACMC immediately issues the use permission to the nodes (C and D) in which the use permission for the request has been held.

Thus, the time during which the data packet from the node (B) passes through the concentrator and is transmitted to the node (A) and the time during which the use permission is issued and transmitted to the nodes (C and D) (or also the processing times at the arbiter and nodes) are overlapped.

As will be also obviously understood from the comparison of FIGS. 10 and 13, waste time during which the data transfer is not performed is reduced.

[Another embodiment]

Figure 14:
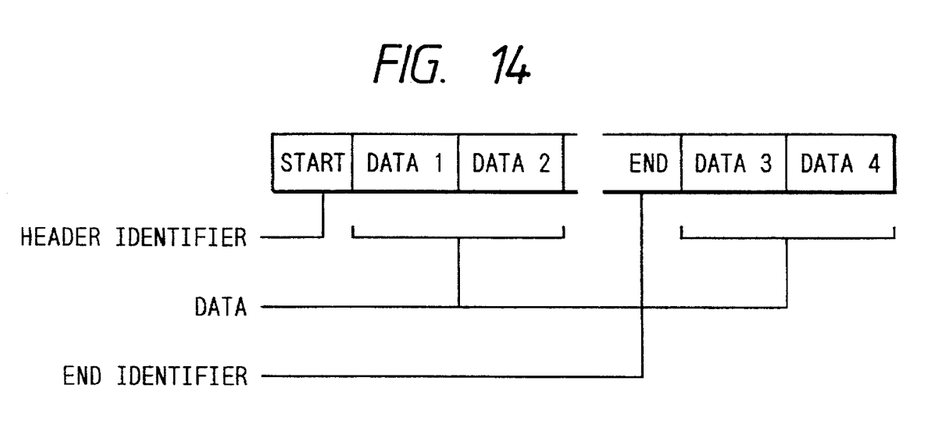
FIG. 14 is a diagram showing a construction of a transfer data packet in another embodiment.

Another embodiment in which the data packet of FIG. 12 is constructed as shown in FIG. 14 is also considered. A data transfer end identifier is inserted before completing transfer of data to be transferred by the data transfer sequencer of the node which prepares and transmits the data packet. In the embodiment, the data transfer end code is inserted at the position of the second prior data blocks from the end of the data transfer, and the data packet is sent. Since the end code can be inserted at a desired position, the inserting position can be determined in consideration of the processing times at the arbiter and nodes, the time period that is required to transmit the permission notification, and the like.

According to a peculiar effect of the embodiment, the processing times for detection of the end code and issue of the permission for the request holding node in the arbiter section and the like and the transfer time of a few last blocks of the data transfer between the nodes at which the data transfer is at present being executed can be further multiplexed, so that the efficiency can be further improved than the above embodiment.

According to the invention as described above, in the system in which a plurality of nodes use the common data transmission line, in the case where the use requests of the data transmission line are overlapped, waste time in the transmission line is reduced, thereby enabling the processing speed in the system to be raised. There is no need to predetermine a time period required to use the transmission line. The processes in the arbiter section can be reduced. The invention can also cope with a data packet of a variable length.

What is claimed is:

1. An information processing apparatus for transmitting data among a plurality of nodes, comprising:

a common transmission line;

a plurality of nodes which are connected by said common transmission line, each said node transmitting data to others of said nodes over said common transmission line;

an arbiter which selectively, gives a use permission, to use said common transmission line for transmitting data, to a requesting one of said nodes on the basis of at least a use request for said common transmission line from the requesting node;

information transmitting means, which couples said arbiter and each of said nodes, for transmitting the use request from the requesting node to said arbiter; and data transmission state detecting means for detecting a data transmission state of data that is transmitted on said common transmission line by monitoring for a separate signal on said common transmission line, said data transmission state detecting means notifying the detected data transmission state to said arbiter to enable said arbiter to use the detected data transmission state to give use permission to the requesting node.

2. An apparatus according to claim 1, wherein the separate signal is either an identifier which was added to data transmitted on said common transmission line and that indicates an end of that data or an identifier that indicates that a current data transmission will be finished after a lapse of a predetermined time.

3. An apparatus according to claim 2, wherein when plural ones of said nodes issue respective use requests and when the use requests are overlapped, said arbiter gives the use permission to a selected one of the nodes that issued the use requests on the basis of the data transmission state detected by said data transmission state detecting means.

4. An apparatus according to claim 1, wherein said common transmission line is connected in a star shape by a star coupler.

5. An apparatus according to claim 4, wherein said data transmission state detecting means detects the transmission state of the data in said star coupler.

6. An apparatus according to claim 1, wherein said common transmission line and said information transmitting means transmit optical signals.

7. An apparatus according to claim 6, wherein said common transmission line and said information transmitting means are constructed in a common optical fiber and transmit multiplexed optical signals multiplexed by wavelength multiplexing.

8. An arbitration method in an information processing apparatus comprising a common transmission line, a plurality of nodes connected by the common transmission line, each node transmitting data to others of the nodes over the common transmission line, an arbiter to selectively give a use permission, to use the common transmission line for transmitting data, to a requesting one of the nodes on the basis of at least a use request for the common transmission line from the requesting node, information transmitting means, which connects the arbiter and each of the nodes, for transmitting the use request from the requesting node to the arbiter, and data transmission state detecting means for detecting a data transmission state of data that is transmitted on the common transmission line, the data transmission state detecting means notifying the detected data transmission state to the arbiter, said method comprising the steps of:

giving, by the arbiter, the use permission to a one of the nodes issuing a first one of the use requests received earliest among plural use requests overlappingly received by the arbiter;

detecting, by the data transmission state detecting means, the use state of the common transmission line during use by the one node by monitoring for a separate signal on the common transmission line; and detecting that the use of the common transmission line by the one node is finished or will be finished after a lapse of a predetermined time, and then giving use permission to another of the nodes that issued a different use request that overlappingly occurred with the first use request.

* * * * *

UNITED STATES PATENT AND TRADEMARK OFFICE
CERTIFICATE OF CORRECTION

PATENT NO. : 5,604,748

DATED : February 18, 1997

INVENTORS : ATSUSHI DATE ET AL.

It is certified that error appears in the above-identified patent and that said Letters Patent is hereby corrected as shown below:

COLUMN 9

Line 62, "selectively," should read --selectively--.

COLUMN 10

Line 59, "line; and detecting" should read --line; and
¶ detecting--.

Signed and Sealed this

Fifteenth Day of July, 1997

Attest:

BRUCE LEHMAN

Attesting Officer     Commissioner of Patents and Trademarks